United States Patent
McDonough et al.

(10) Patent No.: US 7,295,598 B2
(45) Date of Patent: Nov. 13, 2007

(54) SYSTEM AND METHOD FOR INTELLIGENT PROCESSING OF RESULTS FROM SEARCH OF DIRECT SEQUENCE SPREAD SPECTRUM (DSSS) SIGNALS

(75) Inventors: John G. McDonough, La Jolla, CA (US); Gibong Jeong, San Diego, CA (US); Karim Abdulla, San Diego, CA (US); Rajiv R. Nambiar, San Diego, CA (US); William S. Clark, Jr., Escondido, CA (US)

(73) Assignee: Texas Instruments Incorporated, Dallas, TX (US)

( * ) Notice: Subject to any disclaimer, the term of this patent is extended or adjusted under 35 U.S.C. 154(b) by 950 days.

(21) Appl. No.: 10/439,400

(22) Filed: May 16, 2003

(65) Prior Publication Data

US 2004/0228268 A1 Nov. 18, 2004

(51) Int. Cl.
*H04B 1/00* (2006.01)
(52) U.S. Cl. ...................................... 375/150
(58) Field of Classification Search ............... 375/150, 375/147, 142, 141, 140, 130, 343, 340, 316; 342/175, 189
See application file for complete search history.

(56) References Cited

U.S. PATENT DOCUMENTS 6,658,045 B1 * 12/2003 Jin ............................. 375/147

* cited by examiner

*Primary Examiner*—Pankaj Kumar
(74) *Attorney, Agent, or Firm*—Ronald O. Neerings; Wade James Brady, III; Frederick J. Telecky, Jr.

(57) ABSTRACT

A method and system for processing the results of searches for signals in a direct sequence spread spectrum communications system in an intelligent and efficient manner. A preferred embodiment comprises a search engine (for example, search engine 405) and a hardware result processor (for example, result processor 410) with a memory (for example, memory 415) as an interface. The search engine may perform multiple correlations of a pilot channel and then writes the correlation results exceeding a specified threshold to the memory. The result processor reads the correlation results from the memory and performs result filtering and builds a list of maximum value correlation results. The result processor and the search engine functions with independence from one another therefore, there is therefore, little wasted overhead where one has to wait for the other. The result filtering also makes it simpler to combine signal multipaths and simplifies pilot channel strength comparisons.

33 Claims, 7 Drawing Sheets

SYSTEM AND METHOD FOR INTELLIGENT PROCESSING OF RESULTS FROM SEARCH OF DIRECT SEQUENCE SPREAD SPECTRUM (DSSS) SIGNALS

CROSS-REFERENCE TO RELATED APPLICATIONS

This application is related to the following co-pending and commonly assigned patent applications, which applications are hereby incorporated herein by reference.

| Attorney Docket Number | Date Filed | Provisional Ser. No. | Title |
|---|---|---|---|
| TI-34762 | Oct. 1, 2002 | 60/415,218 | System and Method for Detecting Direct Sequence Spread Spectrum Signals Using Pipelined Vector Processing |
| TI-34763 | Oct. 1, 2002 | 60/415,213 | System and Method for Detecting Direct Sequence Spread Spectrum Signals Using Batch Processing of Independent Parameters |
| TI-34766 | Oct. 1, 2002 | 60/415,211 | System and Method for Detecting Multiple Direct Sequence Spread Spectrum Signals Using a Multi-Mode Searcher |
| TI-34767 | Oct. 1, 2002 | 60/415,212 | System and Method for Performing Symbol Boundary-Aligned Search of Direct Sequence Spread Spectrum Signals |

TECHNICAL FIELD

The present invention relates generally to a system and method for digital wireless communications, and more particularly to a system and method for intelligently and efficiently processing the results of searches for signals in a direct sequence spread spectrum communications system.

BACKGROUND

Digital wireless communications systems that use direct sequence spread spectrum (DSSS) techniques transmit data over a larger amount of spectral bandwidth than is necessary. This is commonly referred to as spreading the data. Code Division Multiple Access is a commonly used DSSS technique wherein multiple data streams are encoded using orthogonal codes (for example, Walsh codes) so that the encoded data streams may be simultaneously transmitted without interfering with one another.

In CDMA digital wireless communications systems (including current generation and future generation (third generation (3G)) systems such as CDMA2000 and UMTS (Universal Mobile Telecommunications System)), a control channel referred to as a pilot channel is transmitted by each base station. Each base station transmits a pilot channel that is encoded with a Walsh code and then scrambled with a pseudo-random number (PN) scrambling code. With the Walsh codes being used to distinguish different channels from one base station, while the PN scrambling codes are used to distinguish different base stations.

At power-up, a mobile station needs to acquire synchronization with at least one base station's transmitted pseudo-random number sequence that is carried on a pilot channel. Synchronization (or system acquisition) is used for a variety of purposes, including cell selection, finger assignment and maintenance, channel profile estimation, location identification, and so forth. Synchronization may be a time consuming process wherein a searcher unit in the mobile station performs a series of correlations between signals that it receives and a known copy of the pseudo-random number sequence. A good correlation results in a relatively high correlation value, but that is only the beginning of the synchronization process. Signal multipath may serve to complicate the process.

After correlation results are produced, a significant amount of post processing of the correlation results may be needed to facilitate quick and efficient synchronization. Examples of post processing may include: combination of multipath signals, computation of correlation peaks, computation of signal strength, and so forth.

Previous solutions for acquiring synchronization have involved the use of a hardware searcher (correlator) and software routines to perform needed post processing for set maintenance, finger management, miscellaneous calculations, and so on. The software routines would execute on a digital signal processor (DSP) or some form of general purpose processing element located in the mobile station while the hardware searcher would provide correlation results.

One disadvantage of the prior art is that by implementing the post processing routines in software, a significant amount of processing burden is placed on the processing element (a DSP or some form of general purpose processor) in the mobile station. This processing burden may degrade the mobile station's overall performance by slowing down activities that are handled by the processing element.

A second disadvantage of the prior art is that if the searcher has a throughput that exceeds the throughput of the DSP for post processing of the correlation results, the searcher must either stall and wait for the DSP to catch up or write its correlation results to memory before it may continue its search. This has a result of degrading the synchronization performance.

A third disadvantage of the prior art is that in order to provide sufficient computational power, a sufficiently powered DSP or processing element needs to be used. In general, more powerful DSPs and processing elements are more expensive and consume more power. Therefore, the enhanced DSPs and processing elements result in a mobile station that is more expensive and has shorter battery life (or requires more expensive batteries with larger capacity).

SUMMARY OF THE INVENTION

These and other problems are generally solved or circumvented, and technical advantages are generally achieved, by preferred embodiments of the present invention which provide a method and apparatus for intelligently and efficiently processing the results of searches for signals in a direct sequence spread spectrum communications system.

In accordance with a preferred embodiment of the present invention, a method for correlation result processing comprising reading a correlation result from a memory, filtering the correlation result, determining if the correlation result should be inserted into a list of stored correlation results, and storing the correlation result in the list of stored correlation results if the correlation result should be inserted into the list of stored correlation results.

In accordance with another preferred embodiment of the present invention, a method for finding pilot channels in a direct sequence spread spectrum communications system comprising at a searcher, correlating a received signal with a pseudo-random (PN) number sequence, writing a result of the correlation to a memory, repeating the correlating and writing for other PN number sequences, at a result processor, reading a correlation result from the memory, filtering the correlation result, determining if the correlation result should be inserted into a list of stored correlation results, and storing the correlation result in the list of stored correlation results if the correlation result should be inserted into the list of stored correlation results.

In accordance with another preferred embodiment of the present invention, a circuit for finding pilot channels comprising a search engine containing circuitry to correlate a received signal with a pseudo-random (PN) number sequence, a memory coupled to the search engine, the memory to store results from the correlation performed by the search engine, and a result processor coupled to the memory, the result processor containing circuitry to filter the results of the correlation read from the memory and to maintain a list of a specified number of correlation results exceeding a specified threshold.

In accordance with another preferred embodiment of the present invention, a mobile station comprising an analog front end coupled to an antenna, the analog front end containing circuitry to filter and amplify a received signal provided by the antenna, an analog-to-digital converter (ADC), the ADC to convert an analog signal provided by the analog front end into a digital symbol stream, a digital signal processing unit coupled to the ADC, the digital signal processing unit containing circuitry to decode and despread, error detect and correct, deinterleave and depuncture, correlate and process the digital symbol stream provided by the ADC, and a memory coupled to the digital signal processing unit, the memory to hold correlation results and pilot channel signal strengths.

An advantage of a preferred embodiment of the present invention is that by having a dedicated processor perform the needed post processing of the correlator results, the processing element of the mobile station is free to perform its other activities.

A further advantage of a preferred embodiment of the present invention is that through the use of a memory (a FIFO (First In, First Out) memory) as an interface between the searcher and the dedicated post processor, the searcher can simply write its correlation results to the memory and continue with its search. This improves the performance of the searcher.

Another advantage is that the service time of each correlation result by the dedicated post processor is much shorter than a DSP performing the equivalent post processing. This results in shorter search times since the searcher can keep generating correlations results without having to wait for the post processor to "catch up."

Yet another advantage of a preferred embodiment of the present invention is that the present invention provides a built-in filtering of the correlation results to help reduce the occurrence of false peaks that may skew the correlation results.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely digital wireless communications system that is compliant to the CDMA, CDMA2000, and the UMTS (Universal Mobile Telecommunications System) technical standards. An overview of the CDMA2000 technical standard is provided in a document entitled "Introduction to CDMA2000 Spread Spectrum Systems, Release 0," which is herein incorporated by reference. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other digital wireless communications systems that require the search for specific signals to ensure proper function.

Figure 1:
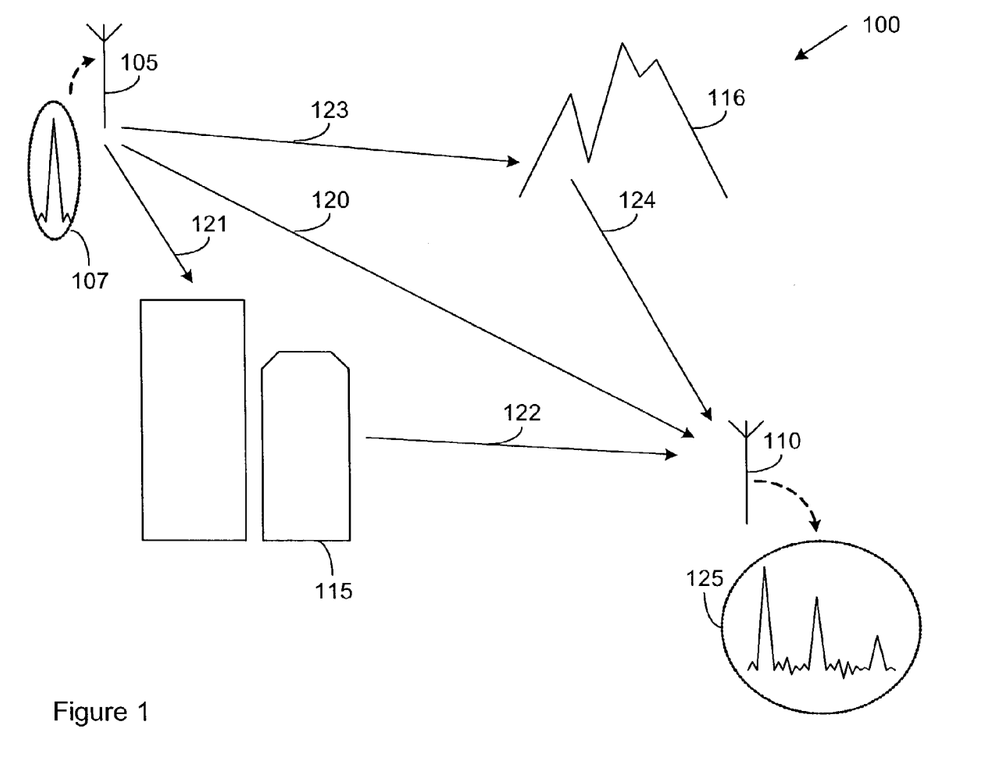
FIG. 1 is a diagram of an exemplary environment for a wireless digital communications system.

With reference now to FIG. 1, there is shown a diagram illustrating an exemplary operating environment 100 for a wireless digital communication system. FIG. 1 displays a portion of a wireless digital communications system, with one base station 105 and one mobile station 110. In a complete wireless digital communications system, there would likely be more than one base station and one mobile station.

FIG. 1 displays a signal (graphically displayed in oval 107) that is transmitted from the base station 105 to the mobile station 107. The transmission of the signal 107 is displayed as taking three separate paths. Note that in an actual real-life situation, a transmission may arrive at a destination after having traveled one or more paths. A first path 120 is a direct, line-of-sight path and goes from the base station 105 to the mobile station 110 with no interference. A second path 121 encounters a building (or two) 115 and is reflected. Its reflection arrives at the mobile 110 via path 122. A third path 123 encounters a mountain (or some hills) 116 and is also reflected and arrives at the mobile 110 via path 124. Since the signal that arrives via the first path 120 traveled a direct path, its travel distance is shortest and it arrives at the mobile station 110 a small amount of time prior to the two reflections, which traveled longer paths 122 and 124. Additionally, since the two signals that are traveled the reflected paths are actually reflections of the original signal, their signals are attenuated due to signal loss in the reflections. The signal, as received at the mobile station 110, is displayed in oval 125.

The received signal 125 can be seen as being composed of the original signal (attenuated by the distance traveled) plus the two reflect signals. This phenomenon is commonly referred to as multipath. Multipath may cause trouble for a receiver that is not designed to handle multipath due to possible interference in the received signal by the multipath signals and the possible confusion of the multipath signals as other signals. However, in a receiver that is designed to handle multipath, the multipath signals can often be combined to produce a received signal that is larger in magnitude than any one of the signals actually received by the receiver.

Figure 2:
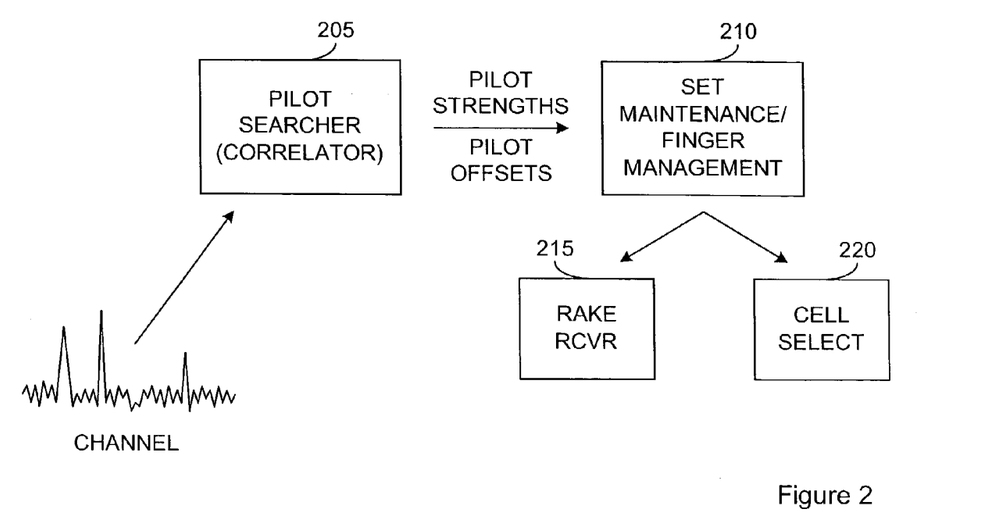
FIG. 2 is a diagram of functions involved in a synchronization search.
Figure 3A:
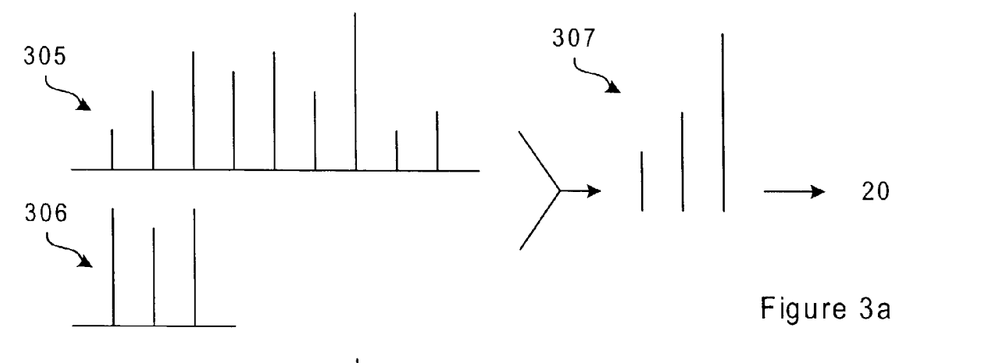
FIGS. 3a through 3d are diagrams illustrating a correlation of two sequences.
Figure 3B:
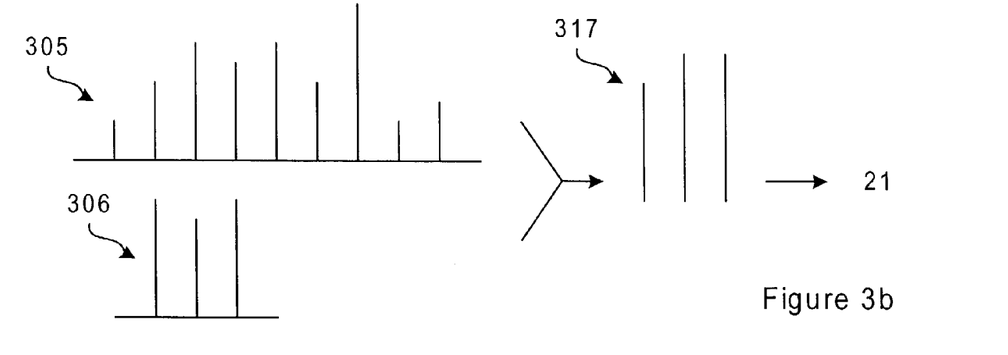
Figure 3C:
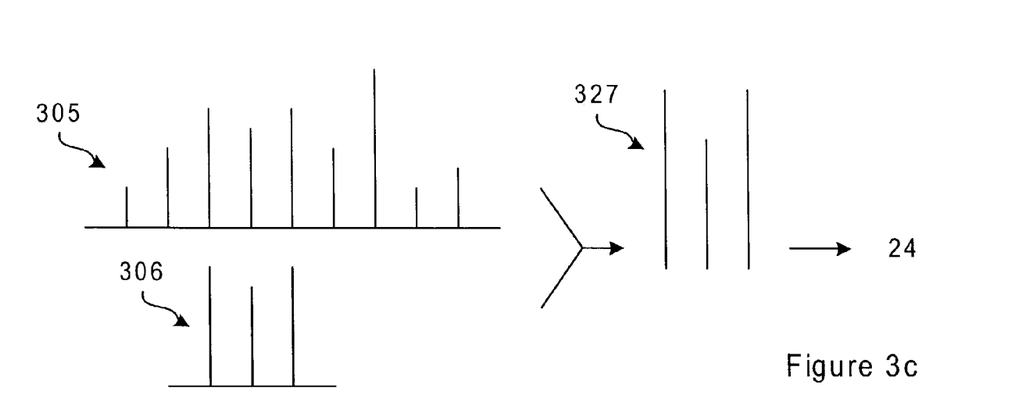
Figure 3D:
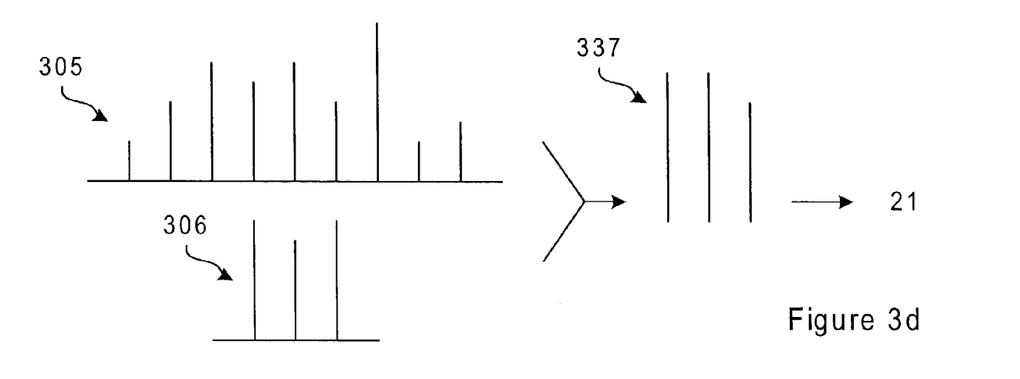

With reference now to FIG. 2, there is shown a block diagram illustrating a typical partitioning of functions in a synchronization search. A first function in a synchronization search is a search (or correlation) function 205. Typically, the search function is performed by a hardware searcher (sometimes referred to as a pilot searcher, search engine, correlator, or a hardware correlator). It is typical for a hardware searcher to have multiple correlators that permit the hardware searcher to simultaneously correlate a received signal from a communications channel with multiple different offsets. By performing the correlations in parallel, the overall correlation time may be reduced.

The results of the correlations (such as pilot signal strengths and pilot channel offsets) can then be provided to a functional block 210 that is responsible for set maintenance and finger management, among other things. Set maintenance has to do with maintaining a list of pilot channels and their offsets that may be used in call hand-offs, mobile station roaming, and so forth. This can be accomplished in a cell selection unit 220. Finger management involves the specification of time offsets for fingers in a rake receiver 215 that is used to combine multipath images so that the received signal may be maximized through the combination of the multiple received images of the original signal.

A fairly typical division line may be drawn between hardware and software at the boundary between the searcher function 205 and the set maintenance/finger management functional block 210, with the searcher function 205 typically being implemented in hardware while the remainder of FIG. 2 being implemented as software routines that execute on a digital signal processor (DSP) or a processing element on a mobile station. Some mobile stations may also have a rake receiver 215 that is implemented in hardware.

However, by pushing relatively complex and computationally intensive tasks such as set maintenance and finger management, as well as multipath combining, into software, a large computational load is added to the DSP (or processing element) of a mobile station. This is in addition to other computational tasks that the DSP may already be assigned to perform. By placing such a large burden on the DSP, a DSP with significant processing power is required which thereby can increase power consumption and per unit costs. If an inadequate DSP is used, then the overall performance of the mobile station may suffer since tasks such as set maintenance and finger management along with the other assigned tasks of the DSP may be required to wait until the DSP can catch up with its work.

With reference now to FIGS. 3a through 3d, there are shown diagrams illustrating the correlation of two discrete signal sequences. Correlation involves the comparison of two sequences and typically involves the multiplication of the two sequences. When two sequences match (or closely match), the summation of the multiplications will yield a result that is larger than when the two sequences do not match, in which case there usually is a low summation value. FIGS. 3a through 3d displays the correlation of two sequences 305 and 306, with the sequence 306 being moved along the sequence 305. When there is a match between a portion of the sequence 305 and the sequence 306 (displayed in FIG. 3c), the summation result is at its maximum.

The correlation process displayed in FIGS. 3a through 3d are examples of what happens in the searcher function 205 (FIG. 2) when the searcher is attempting to find pilot channels. As discussed previously, pilot channels transmit pseudo-random number sequences and the searcher function 205 has a local copy of the pseudo-random number sequence. For each correlation attempt, the searcher function 205 sets a specific pseudo-random (PN) offset for its local copy of the pseudo-random number sequence. The PN offset serves to move the local copy of the pseudo-random number sequence in a fashion similar to the movement of the sequence 306 displayed in FIGS. 3a through 3d. Note that since each base station may be using a different scrambling code to ensure that its pilot channel is unique, there may need to be multiple correlation attempts, each with different scrambling codes, to detect as many pilot channels as possible.

In addition to simply searching for a correct base station (through finding a proper PN scrambling code), it may be necessary to determine a correct frame timing for that particular base station. For this reason, it may be necessary to perform various correlation attempts with differing timing windows (such as different timing window starts, hypothesis resolution, number of hypothesis, and so forth) for a given PN scrambling code.

Figure 4:
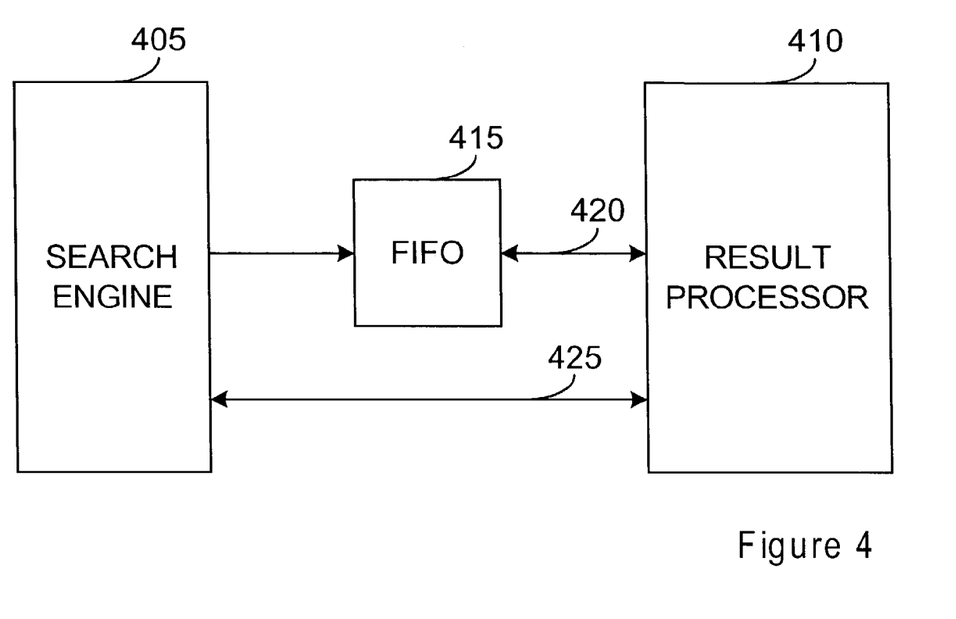
FIG. 4 is a diagram of a search engine with a hardware result processor and memory, according to a preferred embodiment of the present invention.

With reference now to FIG. 4, there is shown a block diagram of a search engine 405 with a hardware result processor 410 and interface, according to a preferred embodiment of the present invention. The search engine 405 may be a hardware implementation of a correlator that may have multiple independently executing correlators that are each capable of correlating an independent local copy of a pseudo-random number sequence with signals received by the mobile station. Each independent local copy of the pseudo-random number sequence may have a different PN offset with which it is correlating against the signals received by the mobile station. Each correlation with a different value for PN offset is commonly referred to as a hypothesis. Because the correlators operate independently of one another, multiple PN offsets may be tested simultaneously, potentially shortening the search process. According to a preferred embodiment of the present invention, the search engine 405 may be configured to save only those correlation results with a magnitude that exceeds a specified threshold. Alternatively, the search engine 405 may save every correlation result. Note that the search engine may configure its correlators for multiple correlation attempts for each possible pilot channel. Additionally, since there may be more than one pilot channel detectable at a mobile station's location, additional correlation attempts may be needed to correlate every detectable pilot channel.

The result processor 410 implements in hardware the post processing functions, such as set maintenance, finger management, multipath combining, and so forth, that are normally implemented as software routines. Serving as an interface between the search engine 405 and the result processor 410 is a memory 415. According to a preferred embodiment of the present invention, the memory 415 is implemented as a first-in first-out (FIFO) memory. In a FIFO memory, the first value written will always be the first value read out, regardless of subsequent writes.

The operation of the search engine 405 with the hardware result processor 410 may be as follows: When in operation, the search engine 405 may correlate a received signal with a number of different hypotheses. Typically, the number of hypotheses will be equal to the number of independent correlators present in the search engine 405, although not necessarily so. After the independent correlators complete, the search engine 405 may write the correlation results along with PN offsets of the correlation results to the memory 415. Depending on how it is configured, the search engine 405 may only write the correlation results whose magnitude exceeds a specified threshold or the search engine 405 may write every correlation result to the memory 415.

If the memory 415 is full and will not hold all of the correlation results that search engine 405 wishes to write to the memory 415, the search engine 405 may write as many as it can and then stall and wait for additional memory space to become free. Alternatively, the search engine 405 may decide to not write any correlation results to the memory 415 until sufficient space is available for it to write all of correlation results to memory.

The result processor 410, upon checking the memory 415 and determining that there are correlation results stored in the memory 415, may then read out the correlation results and begin processing. The result processor 410 may be able to read the memory 415 via a read line (not shown) and the memory 415 may be able to notify the result processor 410 that there are correlation results to process via a FIFO_READY flag line (not shown). Both the read line and the FIFO_READY flag line may be a part of a communications link (or bus) 420 between the memory 415 and the result processor 410. The result processor 410 may read out one correlation result at a time. According to another preferred embodiment of the present invention, the result processor 410 may read out as many as it can process at one time, if it can process multiple correlation results simultaneously. According to a preferred embodiment of the present invention, the result processor 410 will process correlation results from different scrambling codes separately. By keeping the correlation results separate, the result processor 410 may be able to more readily segregate the results per pilot channel.

The result processor 410 and the search engine 405 may be able to perform signaling via a communications link (or bus) 425 connecting the two. Examples of signaling that may be exchanged between the result processor 410 and the search engine 405 may include the result processor 410 notifying the search engine 405 when it has completed the processing of the correlation results for a single pilot channel (CELL_DONE flag line) (not shown). Other signaling may also be exchanged between the result processor 410 and the search engine 405. Examples of other signaling that may be exchanged between the result processor 410 and the search engine 405 may include, but not limited to hypothesis, strength, and record number for a correlation result that is ready for processing and discarded record number data value and discarded record number control strobe.

Figure 5:
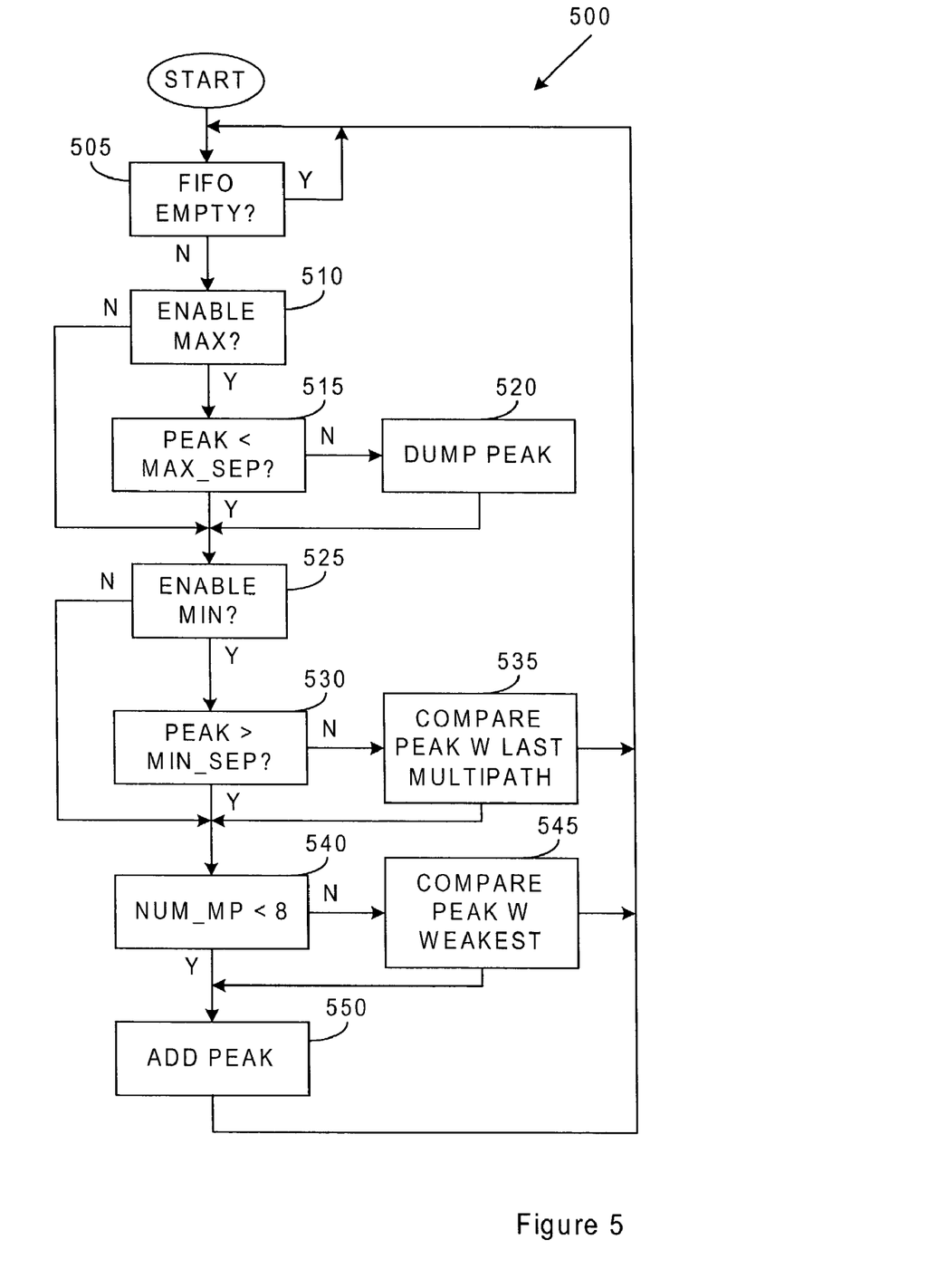
FIG. 5 is a diagram of an algorithm for correlation result processing in a result processor, according to a preferred embodiment of the present invention.

With reference now to FIG. 5, there is shown a block diagram illustrating an algorithm 500 for correlation result processing for a single pilot channel in a result processor, according to a preferred embodiment of the present invention. According to a preferred embodiment of the present invention, the algorithm 500 may be a software routine that executes on a processing element or micro-controller located inside a result processor (for example, the result processor 410 (FIG. 4)). Alternatively, the algorithm 500 may be implemented in firmware or in silicon as part of a custom design application specific integrated circuit (ASIC) that may be a portion (or the entirety) of the result processor 410.

The processing element (or micro-controller or ASIC), when processing correlation results begins by checking the state of the memory (for example, memory 415 (FIG. 4)) in block 505. If the memory 415 is empty, then the processing element will continue to wait until the memory 415 is no longer empty. If the memory 415 is not empty, the processing element will read from the memory a correlation result. According to another preferred embodiment of the present invention, the result processor read several correlation results from the memory 415 at one time. If the result processor 410 can read multiple correlation results, it is preferred that the correlation results all originate from a search for one particular pilot channel. Again, this is so that the result processor can more readily segregate the results on a pilot channel basis.

According to a preferred embodiment of the present invention, the memory 415 is written with correlation results that exceed a specified threshold and correlation results that fail to exceed the specified threshold are discarded. Alternatively, all correlation results may be written to memory and the processing element algorithm 500 may be slightly modified to perform a screening check to ensure that the correlation results exceed the specified threshold.

The processing element, after reading a correlation result from the memory 415, may then check to see if maximum separation checking is enabled (block 510). Maximum separation checking is a form of correlation result filtering that may be helpful in reducing noise in the correlation results. Maximum separation checks to see if the correlation result exceeds some specified distance (typically specified in terms of the PN offset) from a first correlation result peak for the particular pilot channel. Note that in most instances, the first correlation result peak for a particular pilot channel will be the received signal that traveled the direct, line-of-sight path between the base station and the mobile station and will typically have the greatest correlation result magnitude.

If the correlation result exceeds the specified distance, then the correlation result may be discarded without further processing. Maximum separation checking may be effective in reducing noise if the maximum separation is set so that the maximum separation span encompasses the expected delay spread of the communications channel. Therefore, correlation peaks that are within the maximum separation are expected to be multipath reflections while those that are outside of the maximum separation are expected to be noise, interference, or other signals, all of which may be undesired.

The processing element checks to see if the correlation result is within the maximum separation (block 515). If it is not, then the correlation result may be discarded (block 520). The processing element then checks to see if minimum separation checking is enabled (block 525). Similar to maximum separation checking, minimum separation checking is useful for determining if two correlation results are really the result of a single peak. For example, if two adjacent (up to the limit specified by the search resolution) correlation results have values that exceed a specified threshold, then it is likely that the two correlation results are the result of a single peak. The minimum separation is in part a function of the resolution of the correlation search. For example, if the search resolution is a fraction of a PN offset, then the minimum separation should be at least two times the search resolution.

The processing element checks to see if the correlation result exceeds the minimum separation with respect to a most recent correlation result peak exceeding a specified threshold found by the result processor 410 (block 530). If the most recent correlation result peak exceeding a specified threshold and the correlation result are within the minimum separation from one another, then the correlation result and the most recent correlation result peak exceeding a specified threshold are compared (block 535) and according to a preferred embodiment of the present invention, the smaller of the two is discarded and the larger is kept.

If the correlation result and the most recent correlation result peak exceeding a specified threshold are greater than the minimum separation from one another, then the processing element may check to see if it has been able to find more than a specified number of correlation result peaks that exceed a specified threshold (for example, eight) (block 540). If the processing element has been able to find a sufficient number of such correlation results, then the correlation result is compared with a smallest correlation result already found and if the correlation result is greater than the smallest correlation result already found, then the smallest correlation result already found is discarded (block 545).

If the processing element has not been able to find a sufficient number of correlation results with peaks exceeding a specified threshold (or after the processing element has already discarded the smallest correlation result already found (block 545), then the processing element updates a list that contains the correlation result peaks exceeding a specified threshold with the correlation result (block 550). According to a preferred embodiment of the present invention a list is maintained of the specified number of correlation results exceeding a specified threshold (for example, eight) and the list can be ordered, either in descending magnitude or ascending magnitude. Alternatively, the list may be ordered by PN offset. The updating of the list may involve finding where in the list the correlation result should be stored and moving existing correlation results to make room for the correlation result. The processing element then may return to block 505 to continue processing further correlation results.

Figure 6:
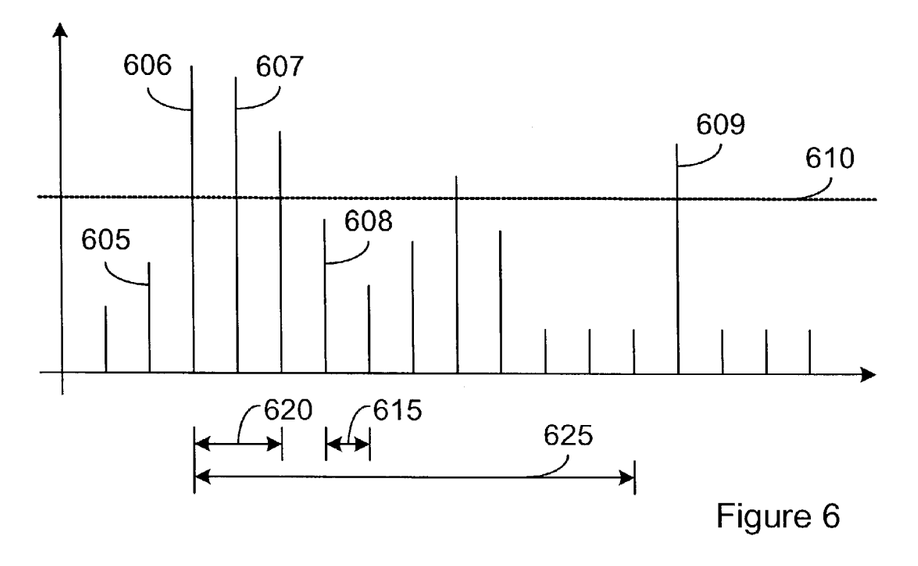
FIG. 6 is a diagram of an exemplary stream of correlation results produced by a search engine, according to a preferred embodiment of the present invention.

With reference now to FIG. 6, there is shown a data graph illustrating an exemplary stream of correlation results produced by a search engine, according to a preferred embodiment of the present invention. The data graph illustrates a series of correlation results (for example, correlation results 605, 606, 607, 608, and 609) and a threshold 610. According to a preferred embodiment of the present invention, correlation results exceeding the threshold 610, such as correlation results 606, 607, and 609 are written to the memory 410 and correlation results not exceeding the threshold 610, such as correlation results 605 and 608 are discarded.

The data graph also illustrates a correlation search resolution 615, a minimum separation value 620, and a maximum separation search value 625. Therefore, according to the algorithm discussed in FIG. 5, correlation result 609 will be discarded because it exceeds the maximum separation from the first correlation result 606. Additionally, correlation result 607 will also be discarded because it lies too close to another correlation result, namely correlation result 606 and is likely the result of the same signal peak.

As discussed previously, the result processor (for example, the result processor 410 (FIG. 4)) maintains a set of correlation results for each detected pilot channel. For example, the result processor 410 may maintain a list of up to the eight (8) largest correlation results for each pilot channel detected. However, the maintenance of a list for each pilot channel may actually make comparisons of the pilot channels difficult since consideration for effects such as signal multipath is not considered. To simply compare the single largest correlation result from each pilot channel may not lead to the reliable detection of the strongest pilot channel. This may be due to the fact that if signal multipaths are added, a formerly weaker signal may become stronger. To make comparisons of the pilot channels easier and more reliable, the result processor 410 may feature signal multipath combination. By reducing the list of correlation results from each pilot channel to perhaps a single value, the comparison of pilot channel strengths can be made significantly simpler and the comparisons made with greater confidence in the results.

Figure 7:
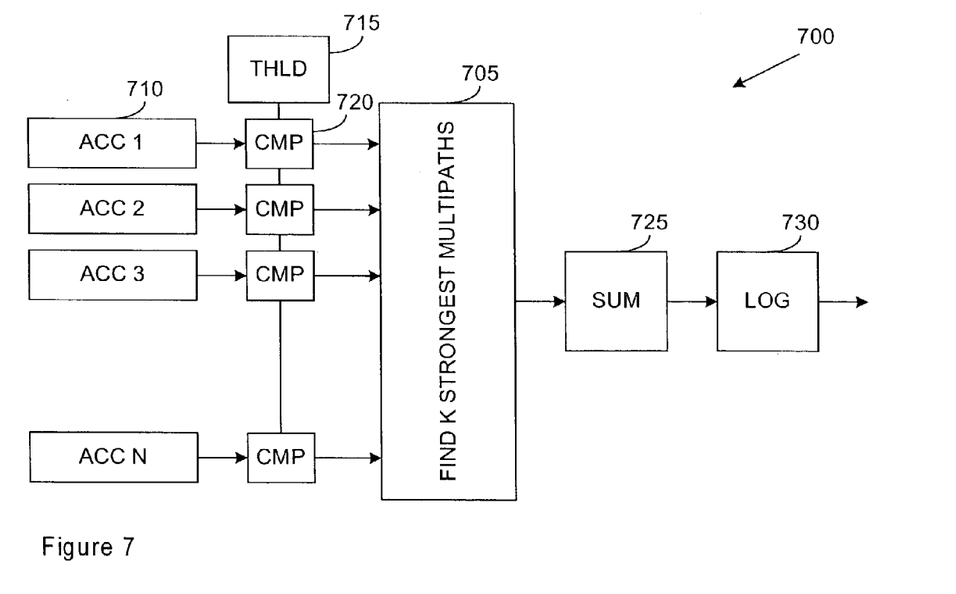
FIG. 7 is a diagram of a process for signal multipath combination, according to a preferred embodiment of the present invention.

With reference now to FIG. 7, there is shown a diagram illustrating a process 700 for signal multipath combination, according to a preferred embodiment of the present invention. The combination of multipath signals into a single signal can be as simple as adding up the correlation results stored in the list of maximum correlation results. The simple addition of the correlation results is possible due to the correlation result filtering that is performed by result processor (for example, result processor 410 (FIG. 4)). The correlation result filtering involved the use of a maximum separation and a minimum separation to discard correlation results that perhaps were not the result of signal multipath and multiple correlation results from a single signal. A more detailed explanation of the correlation result filtering may be found in the discussion of FIG. 5 found above.

FIG. 7 displays a possible sequence of steps that can be used to combine signal multipaths into a single signal. Note that the steps shown in FIG. 7 may occur across different circuits. For example, an accumulator (for example, accumulator_1 710) may be located in a search engine (for example, search engine 405 (FIG. 4)). Also, a threshold 715, such as a specified threshold, may be a memory location or a register that may also be located in the search engine 405. A comparator (for example, CMP 720) may also be located in the search engine 405.

A step 705, labeled as "Find K Strongest Multipaths," may be located in the result processor. Step 705 may be implemented as the algorithm described in FIG. 5, wherein up to the eight largest correlation results per pilot channel is stored in sorted fashion in a list. Finally, a sum operation 725 and a logarithm operation 730 may also be implemented in result processor. The sum operation 725 simply mathematically combines the correlation results stored in the list and the logarithm operation 730 converts a result of the sum operation 725 into an equivalent value in decibels (dB).

Measured pilot channel strength can be expressed as:

Pilot_Energy_Est=α Pilot_Energy_true+θ.

When a hypothesis is true, searcher engine wishes to measure $$\frac{E_c}{I_o},$$

pilot channel energy relative to total energy. However, actual searcher engine output may be expressible as:

$$\frac{NE + I_{oc} - I_o}{NI_o} = \frac{E_c}{I_o} - \frac{1}{N} * \frac{I_{or}}{I_o} = \frac{E_c}{I_o} - \frac{1}{N} * \frac{g}{1+g}.$$

This is due to the fact that it is not only the channel of interest (the pilot channel) being received by an antenna, but also interference channels. The underestimation is particularly large when the mobile station is close to the base station, where $I_{or}$ (non-pilot channel interference) is large and $I_{oc}$ (interference from other pilot channels) is small. Depending on cell geometry factor $$\left(g = \frac{I_{or}}{I_{oc}}\right),$$

the searcher engine (for example, searcher engine 405 (FIG. 4)) may underestimate Ec/Io by as much as 0.5 dB.

A host DSP, such as one located in the mobile station or in the result processor, may calculate $I_{oc}$ and $I_o$, where $I_o=I_{or}+I_{oc}$, then the search engine's $$\frac{E_c}{I_o}$$

may be corrected by application of a linear equation of the form:

OUT=IN*SLOPE+INTERCEPT, where: IN is the pilot channel strength measured by the search engine, OUT is the corrected pilot channel strength, SLOPE is a constant value (typically set to one (1)) that may depend on non-linearities of a mobile station's front end (such as analog-to-digital converters, and so forth), and $$\text{INTERCEPT is } \frac{1 - \frac{I_{oc}}{I_o}}{N}.$$

Figure 8:
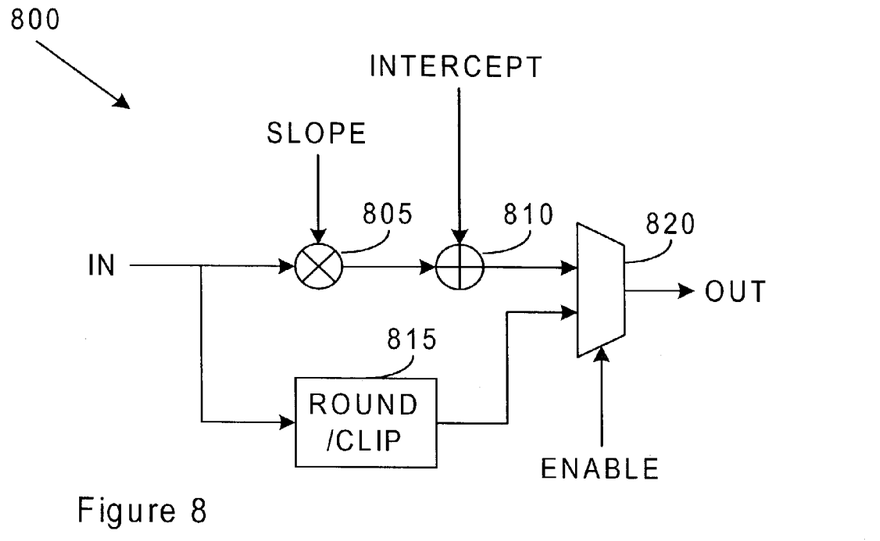
FIG. 8 is a diagram of a circuit for pilot channel strength correction, according to a preferred embodiment of the present invention.

With reference now to FIG. 8, there is shown a diagram illustrating a circuit 800 for pilot channel strength correction, according to a preferred embodiment of the present invention. The circuit 800 implements the linear equation (OUT=IN*SLOPE+INTERCEPT)

discussed above for correcting the pilot channel strength as measured by the search engine. The input (IN) to the circuit 800 is multiplied by a SLOPE by a multiplier 805 and added to an INTERCEPT by an adder 810. A multiplexor 820 controlled by a pilot channel strength correction enable selects between a signal strength corrected pilot channel measurement or one which is simply rounded/clipped by a round/clip circuit 815. The round/clip 815 may round the measured pilot channel strength to a specified level of precision.

Figure 9:
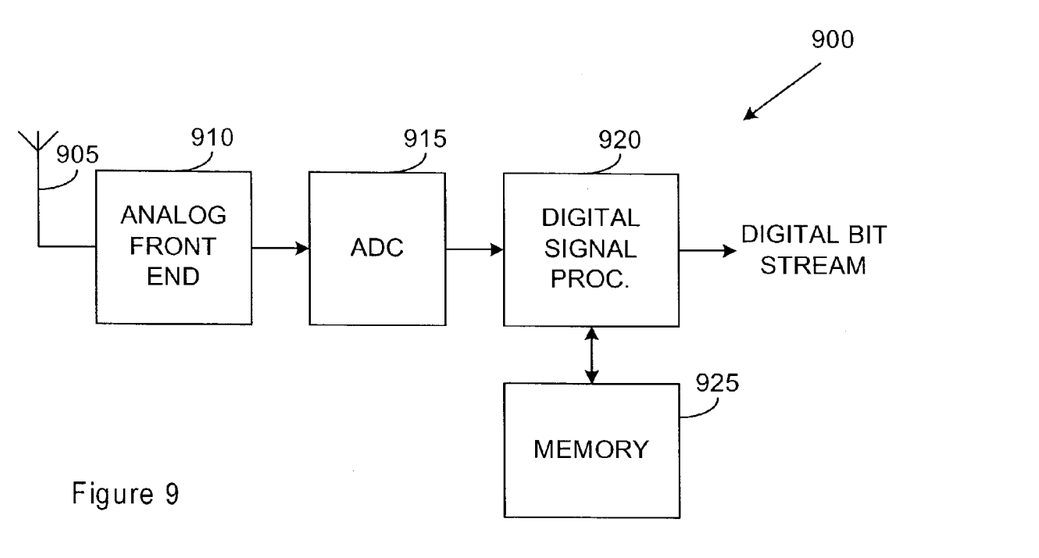
FIG. 9 is a diagram of a portion of a mobile station, according to a preferred embodiment of the present invention.

With reference now to FIG. 9, there is shown a block diagram illustrating a portion 900 of a mobile station, according to a preferred embodiment of the present invention. The portion 900 of the mobile station includes an antenna 905 that receives transmitted signals that are broadcast over-the-air by a base station (not shown). The antenna 905 provides the received signal to an analog front end 910, which is responsible for filtering the received signal to help eliminate out-of-band noise and interference, amplifying the received signal to bring the received signal to a power level that is suitable for processing, and so forth. An analog-to-digital converter (ADC) 915 converts an analog signal into its digital representation.

Digital symbols, as produced by the ADC 915, are provided to a digital signal processing unit 920. The digital signal processing unit 920 is responsible for functions such as error detecting and correcting of the digital symbols, decoding and despreading of the symbol stream, deinterleaving and depuncturing of the symbol stream, and so on. The digital signal processing unit 920 produces a digital bit stream that can be used by digital devices that may be coupled to the mobile station but are not shown. Examples of such digital devices include computers, personal digital assistants (PDA), music/video/multimedia devices, telephony devices, and so forth. Additionally, the digital signal processing unit 920 contains circuitry to help perform the synchronization of the mobile station with the base stations in operation in its general vicinity.

An example of the circuitry that performs the synchronization may be found in FIG. 4 and can include a search engine and a result processor. Additionally, a memory 925 is present to store the results of correlations performed by the search engine and signal strengths of various pilot channels found by the result processor. A more detailed description of the synchronization circuitry may be found in the description of FIG. 4.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for correlation result processing comprising:
   reading a correlation result from a memory;
   filtering the correlation result;
   determining if the correlation result should be inserted into a list of stored correlation results; and
   storing the correlation result in the list of stored correlation results if the correlation result should be inserted into the list of stored correlation results.

2. The method of claim 1, wherein the correlation result is read from a first-come first-out (FIFO) memory.

3. The method of claim 2, wherein the correlation result is written to the FIFO memory by a search engine.

4. The method of claim 3, wherein the correlation result is written to the FIFO memory only if the correlation result exceeds a specified threshold in memory.

5. The method of claim 1, wherein the filtering comprises:
   (a) determining if the correlation result fails a maximum offset test;
   (b) determining if the correlation result fails a minimum offset test; and
   (c) discarding the correlation result if the correlation result fails either offset test.

6. The method of claim 5, wherein the (a) determining comprises comparing an offset associated with the correlation result against an offset associated with a correlation result with an earliest offset stored in the list of stored correlation results, and wherein the correlation result fails if a difference between the offsets is greater than a specified value.

7. The method of claim 5, wherein the (b) determining comprises comparing the offset associated with the correlation result against an offset associated with a correlation result with a most recent offset stored in the list of stored correlation results, and wherein the correlation result fails if a different between the offsets is smaller than a specified value.

8. The method of claim 1, wherein the determining comprises:
   comparing the correlation result with a smallest correlation result stored in the list of stored correlation results; and
   discarding the smallest correlation result if the correlation result is greater in value.

9. The method of claim 8, wherein prior to the comparing, further comprising:
   comparing a number of correlation results stored in the list of stored correlation results with a maximum number of correlation results permitted in the list of stored correlation results; and
   skipping the comparing and discarding if the number of correlation results is less than the maximum number of correlation results permitted.

10. The method of claim 1, wherein the list of stored correlation results is an ordered list, and wherein the storing of the correlation result places the correlation result in proper order in the list of stored correlation results.

11. The method of claim 10, wherein the list of stored correlation results is ordered by offset associated with the correlation results.

12. The method of claim 10, wherein the list of stored correlation results is ordered by magnitude of the correlation results.

13. The method of claim 1 further comprising combining the stored correlation results to produce a single value representing a signal strength.

14. A method for finding pilot channels in a direct sequence spread spectrum communications system comprising:
   at a searcher,
      correlating a received signal with a pseudo-random (PN) number sequence;
      writing a result of the correlation to a memory;
      repeating the correlating and writing for other PN number sequences;
   at a result processor,
      reading a correlation result from the memory;
      filtering the correlation result;
      determining if the correlation result should be inserted into a list of stored correlation results; and
      storing the correlation result in the list of stored correlation results if the correlation result should be inserted into the list of stored correlation results.

15. The method of claim 14, wherein there are a plurality of correlators in the searcher, and wherein the searcher may simultaneously correlate the received signal with different PN number sequences.

16. The method of claim 14, wherein there are a plurality of correlators in the searcher, and wherein the searcher may simultaneously correlate the received signal with one PN number sequences with different PN offsets.

17. The method of claim 14, wherein the correlation result is written to memory if the correlation result exceeds a specified threshold.

18. The method of claim 14, wherein the filtering comprises:
   determining if the correlation result fails a maximum offset test;
   determining if the correlation result fails a minimum offset test; and
   discarding the correlation result if the correlation result fails either offset test.

19. The method of claim 14, wherein the determining comprises:
   comparing the correlation result with a smallest correlation result stored in the list of stored correlation results; and
   discarding the smallest correlation result if the correlation result is greater in value.

20. The method of claim 14, wherein the stored correlation results are combined to produce a single value, and wherein the single value represents a pilot channel's signal strength.

21. The method of claim 20, wherein the single value is represented as a decibel value.

22. A circuit for finding pilot channels comprising:
   a search engine containing circuitry to correlate a received signal with a pseudo-random (PN) number sequence;
   a memory coupled to the search engine, the memory to store results from the correlation performed by the search engine; and
   a result processor coupled to the memory, the result processor containing circuitry to filter the results of the correlation read from the memory and to maintain a list of a specified number of correlation results exceeding a specified threshold.

23. The circuit of claim 22, wherein the memory is a first-in first-out (FIFO) memory.

24. The circuit of claim 22, wherein the search engine may continually write to the memory as long as space remains in the memory to hold results of the correlation.

25. The circuit of claim 22, wherein the result processor may continuously read from the memory as long as there are unread results of the correlation remaining in the memory.

26. The circuit of claim 22, wherein there is a list of a specified number of correlation results for each pilot channel.

27. The circuit of claim 22, wherein the result processor also contains circuitry to combine the correlation results in the list to produce a pilot channel signal strength.

28. The circuit of claim 27, wherein the result processor includes a circuit to correct the pilot channel signal strength.

29. A mobile station comprising:
   an analog front end coupled to an antenna, the analog front end containing circuitry to filter and amplify a received signal provided by the antenna;
   an analog-to-digital converter (ADC), the ADC to convert an analog signal provided by the analog front end into a digital symbol stream;
   a digital signal processing unit coupled to the ADC, the digital signal processing unit containing circuitry to decode and despread, error detect and correct, deinterleave and depuncture, correlate and process the digital symbol stream provided by the ADC; and
   a memory coupled to the digital signal processing unit, the memory to hold correlation results and pilot channel signal strengths.

30. The mobile station of claim 29, wherein the digital signal processing unit comprises:
   a search engine containing circuitry to correlate a received signal with a pseudo-random (PN) number sequence and write results of the correlation to the memory; and
   a result processor coupled to the memory, the result processor containing circuitry to filter the results of the correlation performed by the search engine and to maintain a list of a specified number of correlation results exceeding a specified threshold.

31. The mobile station of claim 29, wherein the mobile station is part of a code-division multiple access (CDMA) wireless communications network.

32. The mobile station of claim 31, wherein the CDMA wireless communications network is CDMA2000 compliant.

33. The mobile station of claim 31, wherein the CDMA wireless communication network is Universal Mobile Telecommunications System (UMTS) compliant.

\* \* \* \* \*